Patented Sept. 26, 1933

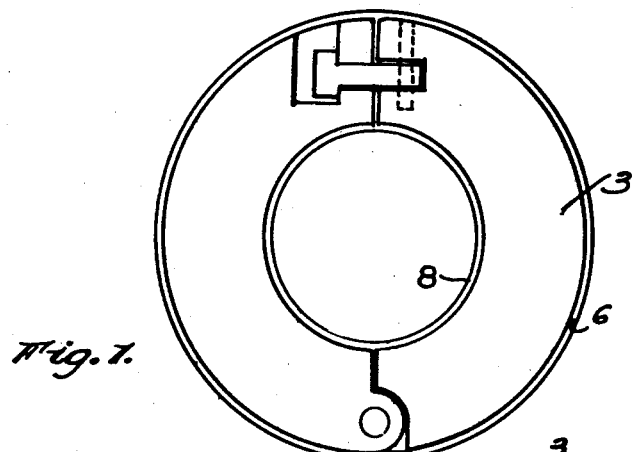
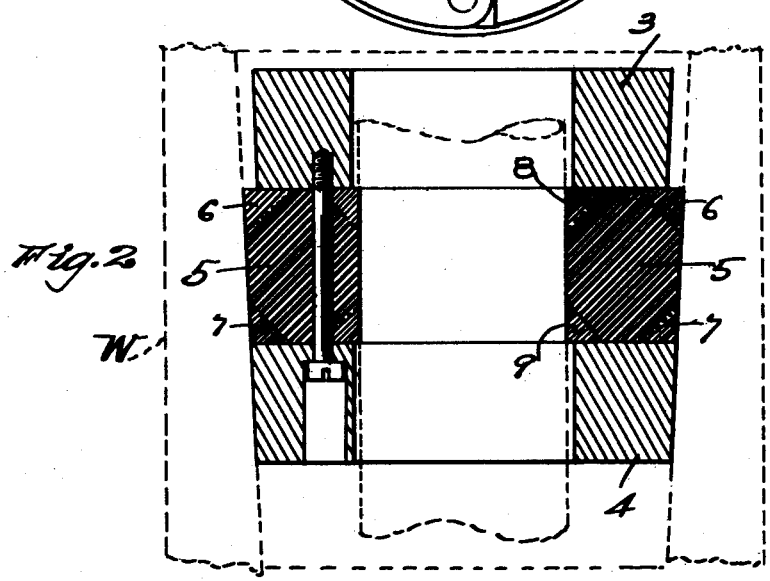
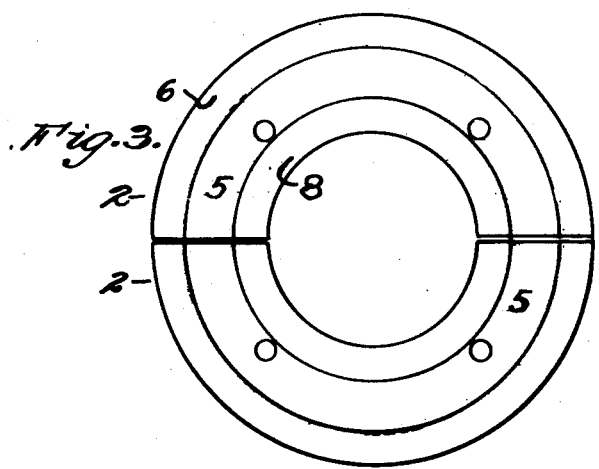

1,928,259

UNITED STATES PATENT OFFICE 1,928,259

GASKET FOR PACKER ASSEMBLIES

Otho Lee McCabe, Brea, Calif., assignor to William D. Shaffer, Brea, Calif.

Application February 24, 1930, Serial No. 431,006
Renewed August 21, 1933

1 Claim. (Cl. 288—1)

This invention relates to packing devices and more especially to a gasket of rubber for use in what is known as a packer assembly, such for instance as is employed in casing heads which constitute an important element in deep-well casing equipment.

Packing assemblies of current form commonly include an upper collar and a lower collar, externally shaped to pass into the relative chamber, such as casing head, and being separated by a thick rubber mat or annulus adapted to be expanded against the wall of the chamber and to compress inward on an interposed rod or other element to seal thereon against leakage of fluid. This rubber gasket has heretofore been made of a more or less uniform degree of density and is found to flow into crevices incident to the structural forms of the structure. Such creep of the gasket is dangerous under high pressure and a purpose of this invention is to provide a gasket which, while providing for effective packing, also prevents any liability of destruction as a result of creepage and blow-out of the packing body under very high pressure.

This object is accomplished by providing a gasket characterized by corners which are of relatively hard and non-flowing composition which is integrally united with the effective sealing portion constituting the softer main body of the gasket.

Specifically the invention consists of a mobile gasket mass presenting corners, at crevices, which are so hard that creepage of any of the gasket body is precluded.

The invention consists in certain advancements in this art as set forth in the ensuing disclosure and having, with the above, additional objects and advantages, and whose construction, combination and details of means, and the manner of operation will be manifest in the description of the herewith illustrative embodiment; it being understood that modifications, variations and adaptations may be restorted to within the scope, principle and spirit of the invention as it is more directly claimed hereinafter.

Figure 1 is a top plan of the assembly.
Figure 2 is an axial section thereof.
Figure 3 is a top plan of the gasket.

While the gasket may be of various sizes and forms it is here shown as consisting of a transverse section of a cone to fit a mutual conical seal, as in a casing head (not shown). The gasket may be of one piece but is here shown as of divided form including duplicate semicircular segments 2—2. These are clinched in place between top collar 3 and bottom collar 4, which, as shown, are diametrically divided, and pivoted one to the other to be opened at one side of the assembly to pass across a cylinder which is to be packed off.

The above describes a conventional packer assembly.

The present improvement resides in the peculiar gasket which has a mass body 5 onto which is vulcanized harder corner forming bodies 6—7 and 8—9, presented at outer top and bottom corners to set against a chamber wall (dotted lines W) and inner top and bottom corners next the axial cylinder (tube or rod) to be packed.

The main gasket mass is of such mobility as to spread in all directions against contacting surfaces to be packed while the corner bodies are so hard that they do not flow and cannot be expressed into adjacent crevices incident to relation of parts of the device, and thus cannot be blown out due to deformation.

The interbonding of the hard bodies with the softer gasket mass forms each section 2 into an integral whole.

What is claimed is:

In a packer assembly for a casing head, a packer body externally adapted to fit in the bore of the casing head and having a through, cylindrical bore for a body disposed concentrically in the casing head; the packer body consisting of a main mass of rubber whose corners at each end of the cylindrical bore are constituted of a harder rubber than the body mass, and each of whose cylindrical, external corners are constituted of a similar harder rubber; the body mass being exposed as an annulus between the harder rubber corners, and the inside and outside surfaces of the body mass being exposed as cylindrical surfaces between the relative inside and outside harder corners; the corners being vulcanized to the body.

OTHO LEE McCABE.